Figure 1:
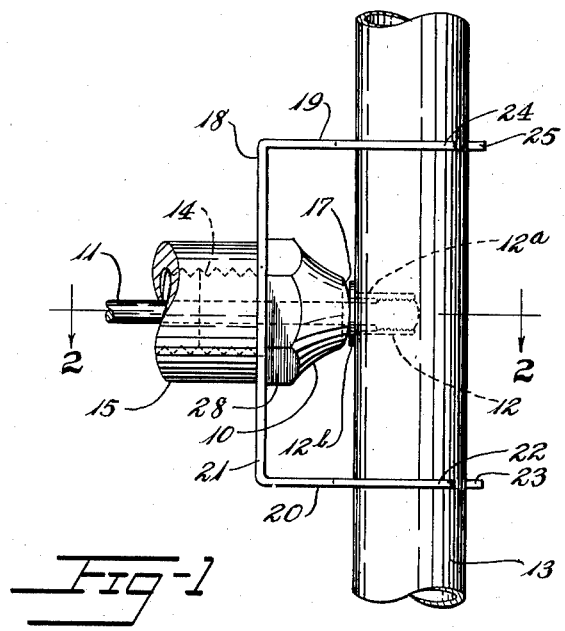

Jan. 29, 1952             R. S. COLLEY             2,583,727
APPARATUS FOR UPSETTING A HEADED TUBULAR RIVET
WHILE ALTERING THE SHAPE OF THE RIVET HEAD
Filed Oct. 21, 1948

Inventor
Russell S. Colley
By Dwight L. Moody
Atty.

Patented Jan. 29, 1952

2,583,727

UNITED STATES PATENT OFFICE 2,583,727

APPARATUS FOR UPSETTING A HEADED TUBULAR RIVET WHILE ALTERING THE SHAPE OF THE RIVET HEAD

Russell S. Colley, Cuyahoga Falls, Ohio, assignor to The B. F. Goodrich Company, New York, N. Y., a corporation of New York Application October 21, 1948, Serial No. 55,778

3 Claims. (Cl. 218—19)

The invention relates to the upsetting of hollow rivets in the walls of tubing and especially headed tubular rivets such, for example, as the flat-headed type in the walls of tubing of generally rounded configuration in cross-section.

Heretofore, tools utilized industrially to upset headed tubular rivets in metal tubing of circular, oval, ellipsoidal, streamline or other generally rounded shape in cross-section by "blind riveting" operations i. e., from the exterior only of the tubing, have not assured disposition of the rivets substantially perpendicular or normal to the curved wall and the longitudinal axis of the tubing. The upsetting tools have not seated the heads of the rivets, especially the flat-headed type, conformingly throughout their extent to the curvature of the wall of the tubing resulting generally in line-contact only of the heads against the tubing in the longitudinal direction of the latter. Line-contact seating of the head together with a non-perpendicular disposition of the upset rivet objectionably weakens the strength of the attachment to the tubing, is unsightly, and permits objectionable accumulation of dirt and other foreign material between the head and the tubing. Subsequent forming operations such, for example, as hand hammering of the head to conform it to the curved wall is inefficient, expensive, and does not assure a secure attachment nor change the angular disposition of the upset rivet to a normal disposition.

An object of the invention is to provide for overcoming the foregoing and other disadvantages of prior upsetting tools and tubular rivet attachments to tubing.

Other objects of the invention are to provide an improved apparatus or attaching tool for upsetting hollow rivets such, for example, as flat-headed tubular rivets in a curved wall such, for example, as the wall of tubing of generally rounded configuration in cross-section; to provide for seating of the head of the rivet conformingly against the curved wall and thereby avoid line-contact only therewith; to provide for an improved attachment of the rivet to the curved wall; and to provide for a substantially normal disposition of the rivet with respect to the longitudinal axis of the tubing, especially laterally of the tubing.

Further objects are to provide for resisting lateral displacement and substantial twisting or relative rotation of the anvil of the tool during the upsetting operation; to provide for registering the anvil with respect to the curved wall; and to provide for simplicity of construction, convenience of manufacture and use, and for effectiveness of operation.

These and other objects and advantages of the invention will be apparent from the following description.

Figures 2, 3:
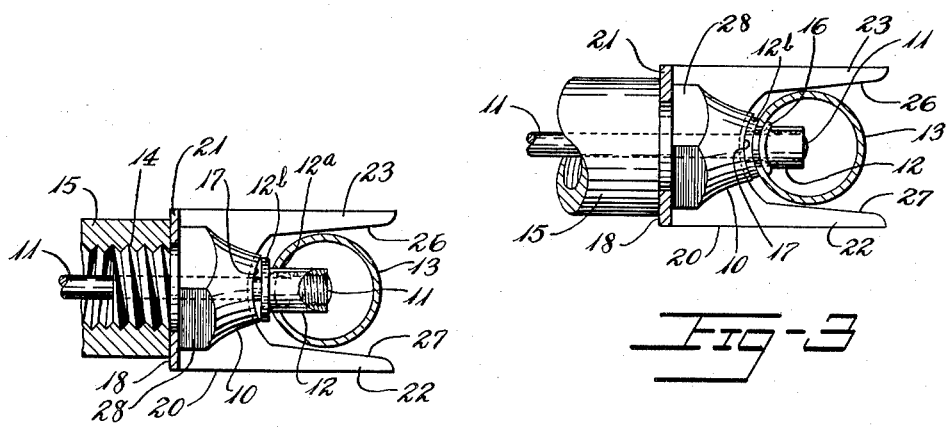

In the accompanying drawings which form a part of this specification and in which like numerals are employed to designate like parts throughout the same, Fig. 1 is a side elevational view showing an attaching tool and a tubular rivet thereon positioned on a length of tubing preparatory to upsetting the rivet, and constructed in accordance with and embodying the invention, parts being broken away and in section, Fig. 2 is a sectional view taken along line 2—2 of Fig. 1, and Fig. 3 is an end view showing the attaching tool with the rivet engaging the tubing after the upsetting operation, parts being broken away and in section.

In the illustrative embodiment of the invention shown in the drawings, the construction includes an anvil 10 of alloy steel or other suitable hard, strong, metal material which is centrally bored for receiving in slidable relation a draw rod 11 extending therethrough, the rod being of suitable metal and threaded at its projecting end to engage the threads of an interiorly threaded hollow rivet 12 which may be flat headed as shown, which rivet is to be upset in a curved wall such, for example, as the wall of a channel or length of tubing 13 of aluminum, steel, brass, plastic or other structural material having a generally rounded configuration in cross-section. The anvil 10 is mounted on and desirably threadedly engages the interiorly threaded end portion 14 of a hollow body or tubular barrel 15 of the attaching or upsetting tool which may be of any suitable kind and desirably an upsetting tool such as is described and claimed in the Harry E. Waner Patent No. 2,069,907 for Apparatus for Installing Tubular Rivets, dated February 9, 1937. The hollow rivet 12 may be of aluminum, steel, brass, or other suitable metal material and desirably of the construction and arrangement described and claimed in the Harry E. Waner Patent No. 2,149,199 for Tubular Rivet, dated February 28, 1939, wherein an outwardly-collapsible, cylindrical intermediate portion 12a of the rivet is outwardly bulged in the upset condition, thereby forming a flange 16 at and in annular conformance about the inner wall-face of the tubing 13.

The body of the anvil 10 terminates at its head-forming end in a troughed seating surface 17 which may be circular as viewed from such end. The surface 17, across its width, may be curved inwardly with respect to said end of the anvil so as to be curved laterally with respect to the longitudinal axis of the tubing for substantially parallel conformance with the curvature of the wall laterally of the tubing. The seating surface 17 may be of suitable contour along its length, that is in the direction across its curvature, so that it has substantially parallel conformance with the wall of the tubing longitudinally of the latter. The construction and arrangement of the seating surface 17 provides a contour across the width of such surface and along its length substantially conforming to the contour of the wall of the tubing when in spaced-apart relation therewith, so as to be adapted to deform a flat head 12b of the rivet into contact with and flush against such wall throughout the entire extent of the head, when the rivet is upset, thereby avoiding line-contact seating of the head.

For the arrangement shown wherein the rivet is to be upset in a straight length of circular-insection tubing, the seating surface 17 is of semicylindrical form, i. e., arcuate and concave across its width with a radius of curvature equal to the radius of curvature of the outer face of the wall of the tubing plus the thickness of the flat head of the rivet, and is substantially straight along its length. The construction is such that, when the rivet is upset as shown especially in Fig. 3, the seating surface 17 is substantially parallel with and in spaced relation to the wall of the tubing 13 axially thereof and substantially parallel, i. e., concentric with and in spaced relation to the wall of the tubing laterally thereof, the radius of curvature of the seating surface and the wall of the tubing, respectively, having a common center coincidental with the longitudinal axis of the round tubing. This facilitates firm seating of the flat head of the rivet in curved conformance about the wall of the tubing. The extent of the seating surface 17 is such as to cover the entire area of the head of the rivet so as to exert forming pressure against the same continuously throughout said area, the forming pressure being applied by virtue of the curvature of the seating surface of the anvil, in a progressively inward manner to the flat head beginning at opposite portions of the outer margin of the head where the outer margin is spaced substantially from the curved wall of the tubing with a part of the head inwardly of said outer margin seated against the curved wall, as shown especially in Fig. 2.

It is desirable, for good results, that the rivet, before upsetting, be disposed and maintained in an aperture of the wall of the tubing so that the axis of the rivet extends along a radial line from the axis of the tubing and substantially perpendicular thereto longitudinally thereof, whereby the axis of the rivet intersects or tends to intersect the axis of the tubing. Thus, the rivet is substantially normal or perpendicular to the apertured wall of the tubing after being upset facilitating the provision of the desired uniform and curved flange 16 or bulge inside the tubing. Also, it is desirable, for good results, that the seating surface 17 be established and maintained in adjustment with respect to a conforming relationship to the wall of the tubing, laterally and longitudinally thereof, to assure the wall-conformance of the rivet head in the upset condition.

Accordingly, the invention provides position-adjusting or bracing means 18 for registering the anvil 10 with respect to the axis of the tubing 13 such that the seating surface 17 conforms in substantially parallel relation to the curved wall of the tubing, which means 18 maintains the registered and conformed relationship of the anvil and the tubing during the upsetting of the rivet, while resisting substantial twisting or rotation of the anvil about its axis relative to the tubing. The adjusting means comprises a saddle or indexing guide structure 18 mounted on the anvil in fixed relation therewith. The saddle structure has register or guide elements 19, 20 disposed to opposite sides of the anvil in the direction of the length of the seating surface and dependent with respect to and in the direction away from the seating surface 17, and has a support element 21 inter-connecting the guide elements and extending desirably perpendicular to the axis of the anvil. The saddle structure may be of one-piece construction and may be made of a strip of steel or other suitable stiff metal material formed desirably to an inverted, flat-bottom channel shape, as viewed from a side of the tubing when positioned thereon. The guide elements 19, 20 constituting the legs of the channel are desirably arranged substantially parallel to one another laterally of the tubing and perpendicular to the axis of the tubing 13 and to the support element 21 constituting the bottom of the channel.

Each guide element may be of a bifurcated or forked construction providing a pair of guide arms or tines 22, 23 and 24, 25 extending in spaced-apart relation and in the direction away from the seating surface 17 and the support element 21 in order to embrace the tubing. The adjacent inner edges 26, 27 of each pair of tines desirably slope away from or diverge with respect to one another in the aforesaid direction defining a tapered opening between the tines adapted to accommodate the tubing with the wall thereof in closely adjacent relation to such edges, when the tool and anvil are engaged with the tubing prior to upsetting the rivet. As shown in Figs. 1 and 2, sufficient clearance is provided between each pair of tines to permit limited additional movement of the anvil and saddle structure toward the tubing during the upsetting operation without binding of the tines against the wall of the tubing, while avoiding objectionable looseness and lateral play between the tines and the tubing. The construction facilitates maintaining the desired relationship of the anvil and the tubing and resists objectionable rotation of the anvil with respect to the tubing. In this connection, the support element 21 is so dimensioned that it maintains the guide elements 19, 20 spaced-apart a sufficient extent so that little or no relative rotation of the anvil may occur during the upsetting operation, despite the limited play and slight clearance between each pair of tines and the tubing.

The saddle structure preferably constitutes an integral part of the anvil in order to prevent relative movement therebetween, so that alignment of the concave seating surface 17 is maintained with respect to the bifurcated guide elements. This may be accomplished as by telescopically mounting and keying, brazing or welding the support element to the anvil at a hexagon-shaped portion 28 thereof spaced from the seating surface, which arrangement permits disposing and clamping the support element 21 between such portion 28 and the end portion 14 of the tubular barrel 15 to further facilitate holding the anvil and saddle structure together and maintaining their alignment.

In the operation of the tool including the anvil 10 and saddle structure 18, the rivet 12 to be upset is threadedly engaged with the projecting end of the draw rod 11 until the flat head of the rivet contacts the seating surface 17. The tool is next disposed with the rivet extending through the aperture in and with the flat head contacting the wall of the tubing and with the guide tines of the guide elements 19, 20 closely embracing the tubing at longitudinally spaced-apart positions to each side of the aforesaid aperture, as shown especially in Figs. 1 and 2. The axial disposition of the rivet is substantially normal to the wall of the tubing along a radial line perpendicular to the longitudinal axis of the tubing laterally and longitudinally thereof, which disposition is initially assured and subsequently maintained by the anvil and saddle structure construction and relationship during the upsetting of the rivet.

Operation of the tool so as to cause axial movement of the draw rod 11 in the direction away from the axis of the tubing, causes the outwardly collapsible portion 12a of the rivet to be annularly bulged to a curved flange 16 seating firmly against in annular conformance with the inner wall-face of the tubing wall, as shown especially in Fig. 3. Coincidental with the bulging of the rivet, the anvil 10 moves in a guided manner by means of the saddle structure toward the axis of the tubing so that the seating surface 17 forms the flat head of the rivet to a laterally curved configuration about the outer wall-face of the tubing and in conformance with the longitudinal contour of the wall, as shown especially in Fig. 3; whereby the wall of the tubing 13 is securely clamped between the curved head 12b and the flange 16, and the rivet is firmly attached to the tubing in a position substantially normal to the wall and to the axis of the tubing, thereby providing a strong attachment. The saddle structure assures maintaining the desired conforming relationship of the seating surface to the wall of the tubing and effectively resists objectionable rotation of the anvil with respect to the wall of the tubing during the upsetting operation further facilitating the provision of a secure and tight attachment of the rivet to the tubing.

Variations may be made without departing from the scope of the invention as it is defined in the following claims.

I claim:

1. Apparatus for attaching in a distortion-resisting elongate wall of outer convex shape and inner concave shape a rivet having a tubular shank terminating in a preformed hollow head having an underface normally not conforming to the outer shape of the wall, while at the same time conforming the head to the outer shape of the wall, said apparatus comprising an anvil having an axial bore therethrough receiving a drawing element adapted to engage the tubular shank of the rivet, said anvil at one end thereof having a rivet-seating surface of troughed configuration surrounding said bore and extending cross-wise to and intersecting the axis of said bore for substantial conformance of said surface in spaced-apart relation to the outer shape of the wall laterally and longitudinally thereof so as to bend and re-form the head of the rivet and seat said underface thereof conformingly against the wall during the upsetting of the shank of the rivet, and bracing means associated with said anvil comprising a guide element spaced from said bore to a side thereof in a direction along the trough of said surface, said guide element having a generally U-shaped construction providing a pair of spaced-apart interconnected guide arms disposed to opposite sides of the trough of said surface and projecting substantially beyond and forwardly of said surface for embracing opposite sides of said elongate wall to facilitate the maintenance of a substantially parallel relationship of the seating surface of said anvil and the elongate wall and to resist turning movement of said anvil relative to the elongate wall and to brace said anvil against tilting in the direction along the trough of said surface during the upsetting of the rivet in the elongate wall.

2. Apparatus for attaching in a distortion-resisting elongate wall of outer convex shape and inner concave shape a rivet having a tubular shank terminating in a preformed hollow head having an underface normally not conforming to the outer shape of the wall, while at the same time conforming the head to the outer shape of the wall, said apparatus comprising an anvil having an axial bore therethrough receiving a drawing element adapted to engage the tubular shank of the rivet, said anvil at one end thereof having a rivet-seating surface of troughed configuration surrounding said bore and extending cross-wise to and intersecting the axis of said bore for substantial conformance of said surface in spaced-apart relation to the outer shape of the wall laterally and longitudinally thereof so as to bend and re-form the head of the rivet and seat said underface thereof conformingly against the wall during the upsetting of the shank of the rivet, and a saddle structure comprising a support on and extending away from said anvil at opposite sides of said bore and in the direction along the trough of said surface and terminating at positions spaced from said anvil in guide elements each having a generally U-shaped construction providing a pair of spaced-apart interconnected guide arms projecting in the direction away from said support at opposite sides of the trough of said surface and projecting substantially beyond and forwardly of said surface for embracing opposite sides of said elongate wall at the spaced-apart positions of said guide elements to facilitate the maintenance of a substantially parallel relationship of the seating surface of said anvil and the elongate wall and to resist turning movement of said anvil relative to the elongate wall and to brace said anvil against tilting in the direction along the trough of said surface during the upsetting of the rivet in the elongate wall.

3. Apparatus for attaching in a distortion-resisting wall of cylindrical tubing a rivet having a tubular shank terminating in a preformed flat-topped hollow head having a flat underface normally not conforming to the cylindrical wall, while at the same time conforming the flat head to the cylindrical wall, said apparatus comprising an anvil having an axial bore therethrough receiving a drawing element adapted to be inserted through the head and engage the tubular shank of the rivet, said anvil at one end thereof having a rivet-seating surface of cylindrically concave configuration surrounding said bore and extending in a direction transverse to the axis of said bore and perpendicular to and intersected by said axis for substantial conformance of said surface in spaced-apart relation to the cylindrical wall of the tubing laterally and longitudinally thereof so as to bend and re-form the flat head of the rivet and seat said underface thereof conformingly against said cylindrical wall during the upsetting of the shank of the rivet, and a saddle structure comprising a support on and extending away from said anvil at diametrically opposite sides of said bore and in the direction along the axis of the cylinder of said surface and terminating at positions spaced substantially from said anvil in guide elements bent from said support, each guide element having a generally U-shaped construction providing a pair of spaced-apart interconnected guide arms projecting in the direction away from said support at opposite sides of said axis of the cylinder of said surface and projecting substantially beyond and forwardly of said surface for embracing opposite sides of the cylindrical wall of the tubing at the spaced-apart positions of said guide elements to facilitate the maintenance of a substantially parallel relationship of the seating surface of said anvil and the cylindrical wall of the tubing and to resist turning movement of said anvil relative to the cylindrical wall of the tubing and to brace said anvil against tilting in the direction along the axis of the cylinder of said surface during the upsetting of the rivet in the cylindrical wall of the tubing.

RUSSELL S. COLLEY.

REFERENCES CITED

The following references are of record in the file of this patent:

UNITED STATES PATENTS

| Number | Name | Date |
|---|---|---|
| 197,235 | Wells | Nov. 20, 1877 |
| 1,093,029 | Bowen | Apr. 14, 1914 |
| 1,196,656 | Bugbee | Sept. 29, 1916 |
| 1,447,520 | Schade | Mar. 6, 1923 |
| 1,468,662 | Gifford | Sept. 25, 1923 |
| 2,069,907 | Waner | Feb. 9, 1937 |
| 2,358,703 | Gookin | Sept. 19, 1944 |
| 2,386,939 | Desmet | Oct. 16, 1945 |
| 2,405,613 | Shaff | Aug. 13, 1946 |
| 2,423,957 | Armtsberg | July 15, 1947 |
| 2,477,056 | Gookin | July 26, 1949 |
| 2,483,112 | Temple | Sept. 27, 1949 |